United States Patent Office 3,361,556
Patented Jan. 2, 1968

3,361,556
METHOD FOR PREPARING SEED FOR ESTABLISHING A PERENNIAL GRASS TURF
Raymond W. Luckenbaugh, Wilmington, Del., assignor to E. I. du Pont de Nemours and Company, Wilmington, Del., a corporation of Delaware
No Drawing. Filed June 17, 1966, Ser. No. 558,271
The portion of the term of the patent subsequent to Oct. 3, 1984, has been disclaimed
7 Claims. (Cl. 71—111)

This application is a continuation-in-part of United States applications Ser. No. 306,307, filed Sept. 3, 1963, and Ser. No. 381,579, filed July 9, 1964, both now abandoned.

This invention relates to grass retardant compositions. More specifically, it refers to a composition of a cycloalkyl ester of a carbanilic acid and bluegrass, bentgrass, or fescue grass seed.

I have discovered that by coating seeds of perennial grasses with a cycloalkyl ester of a carbanilic acid and planting these seeds, there results a marked growth retardation of annual grass plants growing in the vicinity of the planted seed. Exceptional growth retardation is noted with such noxious annual grasses as crabgrass (Digitaria spp.), foxtail (Setaria spp.), barnyard grass (Echinochloa crusgalli), and downy brome (Bromus tectorum). Bermuda grass (Cynodon dactylon), nimblewill (Muhlenbergia schreberi) and Johnson grass (Sorghum halepense) growing from seed are also retarded. Moreover, there is little retardation or injury to the seedling perennial grass plants emerging from the treated seeds.

Crabgrass grows rapidly in the spring. Bare patches of soil found in lawns and fairways at that time of the year are soon covered by crabgrass. Minerals, oxygen and water in the soil needed by desirable perennial grasses are used for the growth of the crabgrass. The more slowly developing and certainly more desirable perennial grasses growing in the vicinity of the crabgrass have little chance to complete and are rapidly crowded out.

Heretofore, the most successful method of starting a new lawn or growing a better one was to plant the perennial grass seed in the fall and hope that the perennial grass would become well established before crabgrass begins to grow in the spring. If the perennial grass plants are not well established by the spring, crabgrass plants have little difficulty in taking over the area during the hot summer months.

By applying a composition of my invention, lawn owners can now plant perennial grass seed such as blue grass, at any time in the year and especially in the spring without fear that annual grasses such as crabgrass will crowd out the blue grass before it becomes established.

An additional advantage derived from the use of the composition of this invention, annual grasses are selectively destroyed. This is accomplished by the low rate of chemical needed to destroy the annual grasses in the vicinity of the germinating perennial grass seeds.

Specifically, the active chemical compounds used in the compositions of this invention to retard the growth of annual grasses are represented by the formula:

(1) 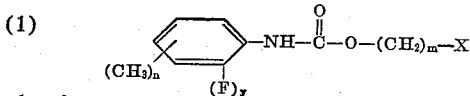

wherein
$n$ is 0 or 1;
$m$ is 0 or 1;
$y$ is 0 or 1; and
X is monohalo-, dihalo-, monomethyl-, dimethyl-, monohalomonomethyl-saturated cycloalkyl where each cycloalkyl has 5 through 8 carbon atoms, monohalo-, dihalo-, monomethyl-, dimethyl-, monohalomonomethyl-saturated bicycloalkyl and unsubstituted saturated bicycloalkyl where each bicycloalkyl has 7 through 8 carbon atoms, monoethyl or diethyl saturated cyclohexyl, saturated cyclohexyl, saturated cycloheptyl, saturated cyclooctyl, with the limitation that when X is cycloalkyl of 5, 7 or 8 carbon atoms or bicycloalkyl of 7 through 8 carbon atoms, $(CH_3)_n$ must be in the meta position.

Preferred compounds because of their low use-cost ratio and particularly outstanding growth retarding ability are compounds of the formula:

(2) 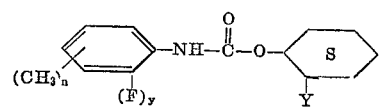

wherein
$n$ and $y$ equal 0 or 1;
Y equals methyl or halogen.

The grass seeds used in compositions of this invention include all of the various species of blue grass, bentgrass and fescue.

COMPOSITIONS

The compositions of my invention will include one of the aforementioned cycloalkyl esters of a carbanilic acid and seeds as well as an acceptable diluent, a sticker and in some instances a surface-active agent, commonly called a surfactant.

The cycloalkyl ester of carbanilic acid, in some compositions, can be mixed with diluents that are dusts or powders. These dusts or powders can include talcs, natural clays, including attapulgite and kaolinite clay, pyrophyllite, diatomaceous earths, synthetic fine silicas, calcium silicate, carbonates, calcium phosphates, sulfur, lime and such flours as walnut shell, wheat, redwood, soybeans and cottonseed. The particle size of the dust or powders can vary considerably but will ordinarily be somewhat under 50 microns in the finished formulation.

In the dust and powder compositions exclusive of the seeds the cycloalkyl ester of carbanilic acid will be present in the range of 25 to 90% by weight so as to minimize the total amount of solids which have to be attached to the seed surface.

Compositions which are aqueous slurries can be prepared by dispersing a finely divided cycloalkyl ester of carbanilic acid in water with a dispersant such as low viscosity polyvinyl alcohol, sodium lignin sulfonate, low viscosity methyl cellulose, polymerized sodium salts of alkyl naphthalene sulfonic acids and the like. Such slurries can also be made from wettable powders containing the cycloalkyl ester of carbanilic acid, a diluent and surfactant such as wetting and dispersing agents which have been mixed and then finely ground into products containing 25 to 90% of the cycloalkyl ester of carbanilic acid. It is often preferred to use suspension concentrates prepared as described in Hochberg U.S. Patent 2,581,414 or Littler U.S. Patent 3,060,084.

These wettable powders or suspension concentrates are used to prepare the aqueous slurry which is then applied by spraying to the seed. Of course, the suspension concentrate can be applied directly to the seed.

The cycloalkyl ester of carbanilic acid ingredient contained in the aforementioned aqueous suspension exclusive of the seed ranges from 25 to 50% by weight.

Emulsifiable solutions can be employed in this invention. These solutions comprise a cycloalkyl ester of carbanilic acid, a surface-active agent, such as an emulsifying agent and an oil solvent. The oil solvent that can be used in these compositions include toluene, kerosene, Stoddard solvent, xylene, alkylated naphthalene, diesel oil, isophorone and the like.

The cycloalkyl ester of carbanilic acid should be present in emulsifying solutions exclusive of the seeds at the rate of 10 to 35% by weight.

The stickers which can be employed to attach the finely ground or pulverulent cycloalkyl ester of carbanilic acid to the seed surface can be selected from a broad class of adhesives, gums and resins and film-forming latexes. Aqueous solutions of natural and synthetic gums and resins can be employed such as gum arabic, gum tragacanth, guar gum, ammonium or alkali metal alginates, ammonium or alkali metal acrylates, polyvinyl alcohols, cellulose derivatives, such as hydroxyethyl, cellulose or ethyl cellulose and the like. Suspensions and solutions of starch and starch derivatives can also be used. Among the film-forming latexes that are useful as stickers are actual or synthetic rubber latex, polystyrene latex, polyacrylate latex, polyethylene latex and the like. Among these latexes a modified polyacrylic latex sold under the trade name of "Rhoplex" and a polyethylene latex sold under the trade name of "Plyac" are preferred. Water soluble adhesives such as those which are conventionally used in paper manufacture can be employed advantageously. Clays that have binding action such as montmorillonite can also be employed.

The amount of sticker required in the compositions of this invention can range from 0.25% to 50% by weight based on the weight of the cycloalkyl ester of carbanilic acid. Generally, a level of 1 to 10% by weight of sticker based on the weight of the cycloalkyl ester of carbanilic acid is preferred.

The surface-active agent employed in this invention can be a wetting, dispersing or an emulsifying agent which will assist dispersion of the compound. The surface-active agent or surfactant can include such anionic, cationic and non-ionic agents as have heretofore been generally employed in plant control compositions of similar type. Suitable surface-active agents are set out, for example, in Searle, U.S. Patent, 2,426,417; Todd, U.S. Patent 2,655,-447; Jones, U.S. Patent 2,412,510; or Lenher, U.S. Patent 2,139,276. A detailed list of such agents is set forth in "Detergents and Emulsifiers—Up to Date" (1962), by John W. McCutcheon, Inc., and Bulletin E–607 of the Bureau of Entomology and Plant Quarantine of the U.S. Department of Agriculture.

Suitable surface-active agents for use in compositions of the present invention are: polyethylene glycol fatty esters and fatty alkylol amide condensates, alkyl aryl sulfonate, fatty alcohol sulfates, dialkyl esters of sodium sulfosuccinate, fatty acid esters of sodium isethionate, polyoxyethylene thioethers and long chain quaternary ammonium chloride compounds.

Surface-active dispersing agents such as sodium lignin sulfonates, low viscosity methyl cellulose, polymerized sodium salts of alkyl naphthalene sulfonic acids are also suitable in the compositions of this invention.

Among the more preferred surfactants are the anionic and non-ionic type. Among the anionic surface-active agents preferred ones are alkali metal or amine salts of alkyl benzene sulfonic acids such as dodecylbenzenesulfonic acid, sodium lauryl sulfate, alkyl naphthalene sulfonates, sodium N-methyl-N-oleoyltaurate, oleic acid ester of sodium isethionate, dioctyl sodium sulfosuccinate, sodium dodecyldiphenyloxide disulfonate. Among the non-ionic compounds, preferred members are alkyl phenoxy poly(ethyleneoxy) ethanols such as nonyl phenol adducts with ethylene oxide; trimethyl nonyl polyethylene glycol ethers, polyethylene oxide adducts of fatty and rosin acids, long chain alkyl mercaptan adducts with ethylene oxide and polyethylene oxide adducts with sorbitan fatty acid esters.

In general, less than 10% by weight of the surface-active agent will be used in compositions of this invention and ordinarily the amount of surface-active agents will range from 1–5% but may even be less than 1% by weight.

A number of methods can be used to attach the cycloalkyl ester of carbanilic acid to the surface of the seed. For example, one can take a dust or a powder containing a cycloalkyl ester of carbanilic acid in finely divided form and tumble it with the seed in order to distribute it throughout the seed volume and then unite the cycloalkyl ester of carbanilic acid with the surface of the seed by spraying a sticker into the mixture. Similarly, aqueous slurries containing a cycloalkyl ester of carbanilic acid can be sprayed on the seed while the seed is being tumbled. The sticker can be applied simultaneously in solution in the aqueous slurry or it can be sprayed on separately. It is also sometimes desirable to apply the cycloalkyl ester of carbanilic acid by spraying on seeds emulsifiable solutions either directly or in water emulsions and in this case the oil solvent can also act as a sticker.

The amount of cycloalkyl ester of carbanilic acid mixed with the seed will be sufficient to apply 2 to 24 pounds of the cycloalkyl ester of carbanilic acid per acre. Therefore, compositions must contain from 1 to 55 pounds of cycloalkyl ester of carbanilic acid per 100 pounds of grass seed. It is preferred that the composition contain 2.5 to 15 pounds of cycloalkyl ester of carbanilic acid per 100 pounds of seed.

In addition, compositions of my invention can contain a seed treating fungicide such as:

metal salts of ethylene bisdithiocarbamic acid, e.g., sodium, manganese, zinc and iron salts;
N - trichloromethylmercapto - 4 - cyclohexene - 1,2 - dicarboximide;
N-trichloromethylthiophthalimide;
2,3-dichloro-1,4-naphthoquinone;
2,3,5,6-tetrachloro-1,4-benzoquinone;
2,4-dichloro-6-(p-chloroanilino)-s-triazine;
copper A; 1,4-dichloro-2,5-dimethoxybenzene;
metal salts of alkyl and dialkyl dithiocarbamic acid, e.g., Zn, Ma, K, Fe, Mn, Ni;
zinc pyridinethione;
S-(1-oxido-2-pyridyl)-isothiuronium chloride;
tetramethylthiuram disulfide;
hydroxymercurichlorophenol and mixtures of these last two.

When present in compositions of this invention the above-described fungicides will be present at the rate of .02 to 10 parts by weight based on the weight of the cycloalkyl ester of carbanilic acid present in the invention.

The following additional examples are provided to explain this invention more clearly. All percents unless otherwise specified are by weight.

Example 1

| | Pounds |
|---|---|
| Carbanilic acid, 2-methylcyclohexyl ester | 12 |
| Kentucky blue grass seed | 174 |
| Water | 9.36 |
| Low viscosity polyvinyl alcohol ("Elvanol" 51–05) | 0.24 |
| Polyacrylic resin emulsion "Rhoplex"® 50% suspension | 2.40 |

The above ingredients are blended by conventional methods. Carbanilic acid, 2-methylcyclohexyl ester is admixed with the dispersing agent and water and then applied to the seeds. The sticker is then added. The seeds are tumbled while adding the other ingredients to effect good distribution. Warm air is forced through the mixture to remove moisture added from the slurry. There results a dry coated seed.

This composition is evenly distributed over one acre of prepared seed bed utilizing a fertilizer spreader. A lush growth of blue grass develops having little or no competition from annual grasses.

Examples 2-169

The following compounds are substituted one at a time for the carbanilic acid, 2-methylcyclohexyl ester of Example 1 in like amount by weight and are formulated and applied in like manner. Like results are obtained.

Examples:

2. Carbanilic acid, cyclohexyl ester.
3. Carbanilic acid, 2-methylcyclohexyl ester.
4. Carbanilic acid, 2-ethylcyclohexyl ester.
5. Carbanilic acid, 2,2-dimethylcyclohexyl ester.
6. Carbanilic acid, 3-methylbicycloheptyl ester.
7. Carbanilic acid, 3,4-dimethylcyclopentyl ester.
8. Carbanilic acid, 2,4-dimethylcycloheptyl ester.
9. Carbanilic acid, 4-methylcyclooctyl ester.
10. Carbanilic acid, 2-methylcyclopentyl ester.
11. Carbanilic acid, 2-(5,6-dimethylnorbornyl)methyl ester.
12. 3-methylcarbanilic acid, 2-methylcycloheptyl ester.
13. Carbanilic acid, 2-methylcyclooctyl ester.
14. Carbanilic acid, 2-ethylcyclohexyl ester.
15. Carbanilic acid, 3,5-dimethylcyclohexyl ester.
16. Carbanilic acid, 2-methylcyclohexyl ester.
17. Carbanilic acid, 2-chlorocyclohexyl ester.
18. 3-methylcarbanilic acid, 2-chlorocyclohexyl ester.
19. Carbanilic acid, 2-bromocyclohexyl ester.
20. Carbanilic acid, 2-bromocyclopentyl ester.
21. Carbanilic acid, 2-bromocyclohexyl ester.
22. Carbanilic acid, 2,2-dichlorocyclohexyl ester.
23. Carbanilic acid, 3-chlorobicycloheptyl ester.
24. Carbanilic acid, 3,4-dichlorocyclohexyl ester.
25. Carbanilic acid, 2,4-dichlorocyclohexyl ester.
26. Carbanilic acid, 4-chlorocyclooctyl ester.
27. Carbanilic acid, 2-chlorocyclopentyl ester.
28. Carbanilic acid, 2-(5,6-dibromonorbornyl)methyl ester.
29. Carbanilic acid, 2-(2-chloro-3-methylnorbornyl) methyl ester.
30. 3-methylcarbanilic acid, 2-chlorocycloheptyl ester.
31. Carbanilic acid, 2-chlorocyclooctyl ester.
32. o-Fluorocarbanilic acid, 2-bromocyclohexyl ester.
33. Carbanilic acid, 3,5-dichlorocyclohexyl ester.
34. Carbanilic acid, cis(2-chlorocyclohexyl)ester.
35. 3-methylcarbanilic acid, 5-chloro-2-norbornyl ester.
36. 3-methylcarbanilic acid, 2-chlorocyclohexyl ester.
37. Carbanilic acid, 2-chlorocyclopentyl ester.
38. Carbanilic acid, trans,cis-2-chloro-1-methylcyclopentyl ester.
39. Carbanilic acid, trans,cis-2-chloro-2-methylcyclopentyl ester.
40. Carbanilic acid, trans,cis-2-chloro-5-methylcyclopentyl ester.
41. 3-methylcarbanilic acid, 2-chlorocyclopentyl ester.
42. 3-methylcarbanilic acid, 1-chloro-2-methylcyclopentylmethyl ester.
43. 3-methylcarbanilic acid, 1-bromocyclopentylmethyl ester.
44. 3-methylcarbanilic acid, 1-chlorocyclopentylmethyl ester.
45. 3-methylcarbanilic acid, trans-2-chlorocyclohexyl ester.
46. 3-methylcarbanilic acid, 4-chlorocyclohexyl ester.
47. 3-methylcarbanilic acid, 2-bromocyclohexyl ester.
48. 3-methylcarbanilic acid, 2-chlorocyclohexylmethyl ester.
49. 3-methylcarbanilic acid, 2-chlorocyclohexyl ester.
50. 3-methylcarbanilic acid, 2-chloro-5-methylcyclohexyl ester.
51. 3-methylcarbanilic acid, 4-bromocyclohexyl ester.
52. 3-methylcarbanilic acid, 2-iodo-1-methylcyclohexyl ester.
53. 3-methylcarbanilic acid, 2-chloro-1-methylcyclohexyl ester.
54. 3-methylcarbanilic acid, 2-bromo-1-methylcyclohexyl ester.
55. 3-methylcarbanilic acid, 2-chloro-5-methylcyclohexyl ester.
56. 3-methylcarbanilic acid, trans-2-iodocyclohexyl ester.
57. 3-methylcarbanilic acid, trans-2-bromocyclohexyl ester.
58. 3-methylcarbanilic acid, cis-2-chloro-2-methylcyclohexyl ester.
59. 3-methylcarbanilic acid, 2-bromocyclohexyl ester.
60. 3-methylcarbanilic acid, 2-chlorocycloheptyl ester.
61. 3-methylcarbanilic acid, 2-bromocyclooctyl ester.
62. 3-methylcarbanilic acid, 2-chloro-6-methylcyclohexyl ester.
63. 3-methylcarbanilic acid, 2-chloro-4-methylcyclohexyl ester.
64. 3-methylcarbanilic acid, 2-chloro-3-methylcyclohexyl ester.
65. 3-methylcarbanilic acid, 2,3-dibromocyclohexyl ester.
66. 3-methylcarbanilic acid, (dl-1-chloro-2-methylcyclohexylmethyl)ester.
67. 3-methylcarbanilic acid, 2-chlorocyclohexylmethyl ester.
68. 3-methylcarbanilic acid, 1,2-dibromocyclohexylmethyl ester.
69. 3-methylcarbanilic acid, 1-chlorocyclohexylmethyl ester.
70. 3-methylcarbanilic acid, 1-bromocyclohexylmethyl ester.
71. 3-methylcarbanilic acid, 2-chlorocycloheptyl ester.
72. 3-methylcarbanilic acid, cis-2-chloro-5-methylcycloheptyl ester.
73. 3-methylcarbanilic acid, cis-1-chloro-2-methylcycloheptyl ester.
74. 3-methylcarbanilic acid, cis-2-chloro-1-methylcycloheptyl ester.
75. 3-methylcarbanilic acid, trans-2-bromocycloheptyl ester.
76. 3-methylcarbanilic acid, trans-2-iodocycloheptyl ester.
77. 3-methylcarbanilic acid, 2-chlorocyclooctyl ester.
78. 3-methylcarbanilic acid, cis-2-bromocyclooctyl ester.
79. 3-methylcarbanilic acid, trans-2-bromocyclooctyl ester.
80. 3-methylcarbanilic acid, trans-4-bromocyclooctyl ester.
81. Carbanilic acid, 5-chloro-2-norbornyl ester.
82. Carbanilic acid, 5-bromo-2-norbornyl ester.
83. Carbanilic acid, 5,6-difluoro-2-norbornyl ester.
84. Carbanilic acid, 5,6-dibromo-2-norbornyl ester.
85. Carbanilic acid, 6-chloro-2-norbornyl ester.
86. Carbanilic acid, 2(5-chloro-2-norbornylmethyl)ester.
87. Carbanilic acid, 2(5-bromo-2-norbornylmethyl)ester.
88. Carbanilic acid, 2(5,6-dichloro-2-norbornylmethyl) ester.
89. Carbanilic acid, trans,cis-1-methylcyclopentyl ester.
90. Carbanilic acid, trans,cis-2-methylcyclopentyl ester.
91. Carbanilic acid, trans,cis-3-methylcyclopentyl ester.
92. Carbanilic acid, trans,cis-1,2-dimethylcyclopentyl ester.
93. Carbanilic acid, 2,2-dimethylcyclopentyl ester.
94. Carbanilic acid, 3,3-dimethylcyclopentyl ester.
95. Carbanilic acid, 3-methylcyclopentylmethyl ester.
96. Carbanilic acid, 2-methylcyclopentylmethyl ester.
97. Carbanilic acid, (cis-2,3-dimethylcyclopentylmethyl) ester.
98. Carbanilic acid, 1-methylcyclohexyl ester.
99. o-Fluorocarbanilic acid, 2-methylcyclohexylmethyl ester.
100. Carbanilic acid, 3-methylcyclohexyl ester.
101. Carbanilic acid, 4-methylcyclohexyl ester.
102. Carbanilic acid, 1-ethyl cyclohexyl ester.
103. Carbanilic acid, 3,4-dimethylcyclohexyl ester.
104. Carbanilic acid, 1,3-dimethylcyclohexyl ester.
105. Carbanilic acid, 2,4-dimethylcyclohexyl ester.
106. Carbanilic acid, 3,5-dimethylcyclohexyl ester.
107. Carbanilic acid, 1,4-dimethylcyclohexyl ester.
108. Carbanilic acid, 2,5-dimethylcyclohexyl ester.

109. o-Fluorocarbanilic acid, 2-methylcyclohexyl ester.
110. o-Fluorocarbanilic acid, 3-methylcyclohexyl ester.
111. Carbanilic acid, (dl-cis-2-methylcyclohexyl)ester.
112. Carbanilic acid, (dl-trans-2-methylcyclohexyl)ester.
113. Carbanilic acid, (1-cis-3-methylcyclohexyl)ester.
114. Carbanilic acid, (dl-cis-3-methylcyclohexyl)ester.
115. Carbanilic acid, (1-trans-3-methylcyclohexyl)ester.
116. Carbanilic acid, cis-2-ethylcyclohexyl ester.
117. Carbanilic acid, trans-2-ethylcyclohexyl ester.
118. Carbanilic acid, 2,6-dimethylcyclohexyl ester.
119. Carbanilic acid, $2^t,4^c$-dimethylcyclohexyl ester.
120. Carbanilic acid, ($3^c,5^c$-dimethylcyclohexyl$^c$)ester.
121. o-Fluorocarbanilic acid, 3,5-dimethylcyclohexyl ester.
122. o-Fluorocarbanilic acid, cyclohexylmethyl ester.
123. Carbanilic acid, 2,2-dimethylcyclohexyl ester.
124. Carbanilic acid, 1,2-dimethylcyclohexyl ester.
125. Carbanilic acid, 4-ethylcyclohexyl ester.
126. Carbanilic acid, 3,3-dimethylcyclohexyl ester.
127. Carbanilic acid, cis-2-ethylcyclohexyl ester.
128. Carbanilic acid, 3-ethylcyclohexyl ester.
129. 3-methylcarbanilic acid, cycloheptyl ester.
130. 3-methylcarbanilic acid, cyclooctyl ester.
131. Carbanilic acid, 2,2-dimethylcyclohexyl ester.
132. Carbanilic acid, 4,4-dimethylcyclohexyl ester.
133. Carbanilic acid, 1,2-diethylcyclohexyl ester.
134. Carbanilic acid, (2,3-dimethylcyclohexylmethyl) ester.
135. Carbanilic acid, (2,6-dimethylcyclohexylmethyl) ester.
136. Carbanilic acid, (3,3-dimethylcyclohexylmethyl) ester.
137. Carbanilic acid, (2-methylcyclohexylmethyl) ester.
138. Carbanilic acid, (cis-2-methylcyclohexylmethyl) ester.
139. Carbanilic acid, (trans-2-methylcyclohexylmethyl) ester.
140. Carbanilic acid, (cis-3-methylcyclohexylmethyl) ester.
141. Carbanilic acid, (trans-3-methylcyclohexylmethyl) ester.
142. Carbanilic acid, (trans-4-methylcyclohexylmethyl) ester.
143. Carbanilic acid, (1-methylcyclohexylmethyl)ester.
144. Carbanilic acid, (1-ethylcyclohexylmethyl)ester.
145. Carbanilic acid, cycloheptyl ester.
146. Carbanilic acid, 2,2-dimethylcycloheptyl ester.
147. Carbanilic acid, 2-methylcycloheptyl ester.
148. Carbanilic acid, trans-2,2-dimethylcycloheptyl ester.
149. Carbanilic acid, cis-2,2-dimethylcycloheptyl ester.
150. Carbanilic acid, 4-methylcycloheptyl ester.
151. Carbanilic acid, trans-3-methylcycloheptyl ester.
152. Carbanilic acid, 4,4-dimethylcycloheptyl ester.
153. Carbanilic acid, 1-methylcycloheptyl ester.
154. Carbanilic acid, cyclooctyl ester.
155. Carbanilic acid, cis-2-methylcyclooctyl ester.
156. Carbanilic acid, trans-2-methylcyclooctyl ester.
157. Carbanilic acid, 2,2-dimethylcyclooctyl ester.
158. Carbanilic acid, 1-methylcyclooctyl ester.
159. Carbanilic acid, 2-norbornyl ester.
160. Carbanilic acid, (2-norbornylmethyl)ester.
161. Carbanilic acid, α-nopinol ester.
162. Carbanilic acid, β-nopinol ester.
163. 2-methylcarbanilic acid, 2-methylcyclohexyl ester.
164. 4-methylcarbanilic acid, 2-methylcyclohexyl ester.
165. 2-methylcarbanilic acid, 2-chlorocyclohexyl ester.
166. 4-methylcarbanilic acid, 2-chlorocyclohexyl ester.
167. 2-methylcarbanilic acid, 3-methylcyclohexyl ester.
168. 4-methylcarbanilic acid, 3-methylcyclohexyl ester.
169. 2-methylcarbanilic acid, 2,4-dimethylcyclohexyl ester.

*Example 170*

The following wettable powder is prepared by grinding the ingredients until the particle size of the mixture is substantially below 50 microns:

| | Percent |
|---|---|
| Carbanilic acid, 2-chlorocyclohexyl ester | 80 |
| Montmorillonite clay | 16 |
| Dioctyl sodium sulfosuccinate | 2 |
| Partially desulfonated sodium lignin sulfonate | 2 |

Five pounds of this powder is dispersed in one gallon of water, and there is added one quart of "Plyac," a polyethylene latex containing approximately 35% solids. This mixture is then applied to 75 pounds of Highland bent grass seed by tumbling the seed in a cement mixer, spraying in the above slurry, and forcing hot air through the bed to remove excess moisture.

*Example 171*

The following composition, prepared by mixing and grinding the ingredients to obtain a fine pulverulent dust, is mixed with grass seed at rate of 18 pounds of composition per 100 pounds of alta fescue.

| | Percent |
|---|---|
| Carbanilic acid, cycloheptyl ester | 80 |
| Calcium lignin sulfonate | 2 |
| Alkyl naphthalene sulfonic acid, sodium salt | 2 |
| $Ca_2SO_4 \cdot H_2O$ | 1 |
| Tricalcium phosphate | 7 |
| Attapulgite clay | 8 |

When a substantially uniform mixture has been obtained the dust is attached to the seed by spraying two quarts of a 10% solution of polyvinyl alcohol over the seed surface while tumbling continues to maintain uniformity. The treated seed is then air-dried.

*Example 172*

A suspension concentrate as follows is prepared by sand-milling the ingredients for 45 minutes with an equal volume of 20–30 mesh Ottawa sand:

| | Percent |
|---|---|
| Carbanilic acid, 5-chloronorbornyl ester | 25.00 |
| Hydrated attapulgite | 1.75 |
| $Na_2HPO_4$ | 0.80 |
| Sodium pentachlorophenate | 0.60 |
| Sodium lignin sulfonate | 15.00 |
| Water | 56.85 |

The composition is applied to grass seed by spraying the concentrate directly on the seed while the latter is being tumbled. No additional sticker is needed

*Example 173*

The composition of Example 171 is applied by tumbling 12.5 pounds of the powder with 90 pounds of Kentucky blue grass and 80 pounds of Pennlawn fescue. A solution of 6 ounces of "Seed Coat" (a methyl cellulose based seed adhesive) in 6 quarts of water is prepared. This solution is applied to the surface of the tumbling seed in a fine atomized stream to attach the powder to the surface of the seed. The seed is then dried prior to storage.

*Example 174*

This treated seed of Example 170 is seeded at the rate of 2 pounds per 1000 square feet on newly prepared soil of areas to be used for golf tees. The bent-grass germinates and becomes established as a satisfactory turf with little or no competition from such annual grasses as barnyard, crab and foxtail. The annual grass weeds germinate but are so severely retarded that they offer no competition to the bent.

*Example 175*

The treated fescue of Example 171 is seeded at the rate of 5 pounds per 1000 square feet to a freshly prepared seedbed of an area to be used as a playground. The fescue becomes established as a dense stand of grass with little or no competition from crabgrass, foxtail, or barnyard grass developing from seed.

Example 176

The seed prepared above in Example 173 is seeded on a prepared seedbed in the spring at the rate of 4 pounds per 1000 square feet. The chemical treatment allows the establishment of a good turf without serious competition from weedy annual grasses such as crabgrass, foxtail and barnyard grass.

For the purposes of this specification prepared soil is defined in the conventional manner as an area where it is desired to establish a turf. This can be a freshly tilled and raked area, a scarified area surrounded by desirable established grasses or an area containing a thin stand of turf grasses which has been worked to remove the duff. Compositions of this invention and the methods employing these compositions will control annual weed grasses in prepared seed beds up to the time the annual weed grasses reach the three leaf stage.

The invention claimed is:

1. Method for preparing seed suitable for establishing a perennial grass turf comprising applying to perennial grass turf seed, based on a weight of 100 pounds of perennial grass turf seed, from one to fifty-five pounds of a compound of the formula:

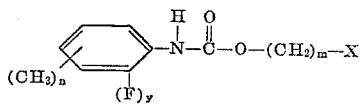

wherein $m$, $n$ and $y$ are separately selected from the group consisting of 0 and 1;

X is selected from the group consisting of monohalo-, dihalo-, monomethyl-, dimethyl-, monohalomonomethyl-saturated cycloalkyl where each cycloalkyl has 5 through 8 carbon atoms, monohalo-, dihalo-, monomethyl-, dimethyl-, monohalomonomethyl-saturated bicycloalkyl and unsubstituted saturated bicycloalkyl where each bicycloalkyl has 7 through 8 carbon atoms, monoethyl and diethyl saturated cyclohexyl, saturated cyclohexyl, saturated cycloheptyl, saturated cyclooctyl; with the limitation that when X is cycloalkyl of 5, 7 and 8 carbon atoms and bicycloalkyl of 7 through 8 carbon atoms, $(CH_3)_n$ must be in the meta position.

2. A method according to claim 1 wherein the perennial grass turf seed is blue grass.

3. A method according to claim 1 wherein the perennial grass turf seed is fescue.

4. A method according to claim 1 wherein the perennial grass turf seed is bent grass.

5. Method according to claim 1 wherein the compound applied is carbanilic acid, 2-methylcyclohexyl ester.

6. Method according to claim 1 wherein the compound applied is carbanilic acid, 3-methylcyclohexyl ester.

7. Method according to claim 1 wherein the compound applied is o-fluorocarbanilic acid, 2-methylcyclohexyl ester.

References Cited

UNITED STATES PATENTS

| | | | |
|---|---|---|---|
| 2,671,985 | 3/1954 | Vogelsong | 71—2.2 X |
| 2,812,247 | 11/1957 | Gysin et al. | 71—2.3 |
| 2,967,376 | 1/1961 | Scott | 71—2.1 X |
| 3,149,954 | 9/1964 | Harrod | 71—2.5 |

FOREIGN PATENTS

| | | |
|---|---|---|
| 500,284 | 2/1939 | Great Britain. |
| 509,282 | 7/1939 | Great Britain. |

OTHER REFERENCES

George et al.: Agriculture and Food Chemistry, vol. 2, #7, Mar. 31, 1954, pp. 356–363.

JAMES O. THOMAS, JR., *Primary Examiner.*